3,565,955
META-METHOXY-α-METHYL-PHENETHYL-AMINO-DIPHENYLMETHYL ETHERS

Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 431,753, Jan. 11, 1965, which is a division of application Ser. No. 255,208, Jan. 31, 1963. This application Oct. 23, 1967, Ser. No. 677,469
Int. Cl. C07c 93/08
U.S. Cl. 260—570                                6 Claims

ABSTRACT OF THE DISCLOSURE

Basically substituted diphenyl-methyl ethers of the formula

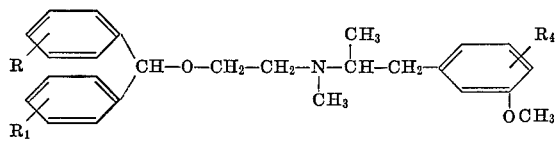

in which R and $R_1$ are hydrogen, chlorine, bromine, hydroxyl, alkyl of 1 to 3 carbon atoms, or alkoxy of 1 to 3 carbon atoms, and $R_4$ is hydrogen or methoxy having beneficial physiological activity in the treatment of heart and circulatory diseases.

---

This application is a continuation-in-part of U.S. application Ser. No. 431,753 filed Jan. 11, 1965 and now abandoned which in turn is a divisional application of U.S. application Ser. No. 255,208 filed Jan. 31, 1963 and since abandoned.

The present invention relates to basically substituted diphenyl-methyl ethers and their addition salts with physiologically tolerable acids which show favorable physiological action particularly on the heart and the blood circulation. The compounds are useful as medicaments causing dilation of the coronary vessels. The invention also relates to processes for preparing the afore-mentioned compounds, and furthermore provides pharmaceutical preparations containing basically substituted diphenyl-methyl ethers as active ingredients and exhibiting beneficial action on the heart and the blood circulation.

We have found a process of the manufacture of basically substituted diphenyl-methyl ethers of the general Formula I

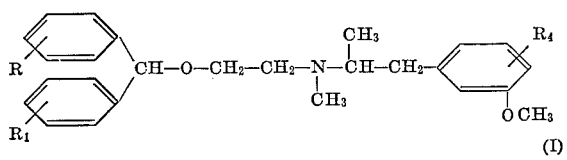

in which R and $R_1$ each represent hydrogen, chlorine, bromine, hydroxyl or an alkyl or alkoxy group containing at most 3 carbon atoms and $R_4$ represents hydrogen or the methoxy group, and of the addition salts of said compounds with physiologically tolerable acids, wherein:

(a) An amine of the general Formula II

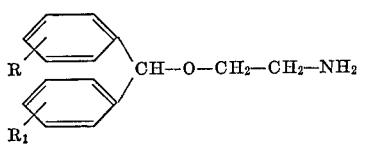

in which R and $R_1$ each represent hydrogen, chlorine, bromine, hydroxyl, benzyloxy or an alkyl or alkoxy group containing at most 3 carbon atoms, is condensed with a phenyl-acetone compound substituted by one or two methoxy groups in the phenyl nucleus and is simultaneously or subsequently hydrogenated, or wherein (b) An amine of the general Formula II is condensed with a 1-phenyl-2-halogen-propane compound or a 1-phenyl-2-halogen-propene compound substituted by one or two methoxy groups in the phenyl nucleus, and in case of a double bond, is hydrogenated, or wherein (c) A halogenated diphenyl-methyl ether of the general Formula III

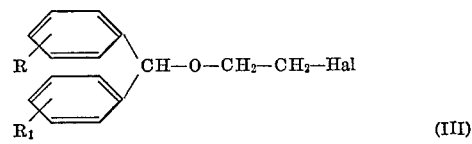

in which R and $R_1$ each have the meanings given sub (a), and Hal represents chlorine, bromine or iodine is condensed with a 2-amino-3-phenyl-propane compound substituted by one or two methoxy groups in the phenyl nucleus, preferably in the presence of an agent binding hydrogen halide, or wherein (d) A benzhydrol compound, the phenyl moieties of which are substituted by the groups R and $R_1$ having the meanings given sub (a) is condensed with a halogenated amine of the general Formula IV

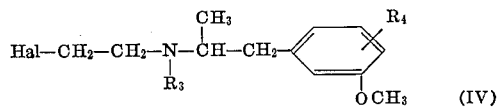

in which Hal represents chlorine, bromine or iodine, $R_3$ represents hydrogen, methyl or benzyl and $R_4$ represents hydrogen or methoxy, preferably in the presence of an agent binding hydrogen halide, or wherein (e) A diphenyl-bromomethane compound, the phenyl radicals of which are substituted by the groups R and $R_1$ having the meanings given sub (a), is condensed with a compound of the general Formula V

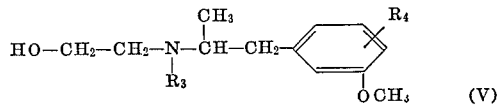

in which $R_3$ and $R_4$ have the meanings given sub (d), preferably in the presence of an agent binding hydrogen halide, or wherein (f) An acid amide of the general Formula VI

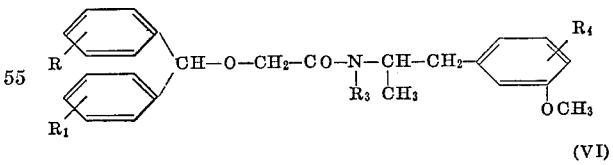

in which R and $R_1$ to $R_4$ have the meanings given sub (d), is reduced, whereupon a compound of the general VII

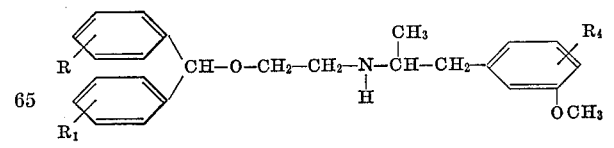

in which R, $R_1$ and $R_4$ have the meanings given sub (a) is methylated at the nitrogen atom and in case of O-benzyl radicals or N-benzyl radicals, the compound thus obtained is hydrogenated, and if desired, the base thus obtained is converted into the corresponding addition salt by means of a physiologically tolerable acid.

The products of the invention are advantageously prepared according to the method described sub (a). In this case, an amine of the general Formula II is condensed with the corresponding phenyl-acetone compound and the condensation product is reduced simultaneously or subsequently. As starting substances there may be used, for example, the following amines:

1-(diphenyl-methoxy)-ethylamine-(2),
1-[(4'-chlorophenyl-phenyl)-methoxy]-ethylamine-(2),
1-[(4'-chlorophenyl-4''-chlorophenyl)-methoxy]-ethylamine-(2),
1-[(4'-tolyl-phenyl)-methoxy]-ethylamine-(2),
1-[(4'-methoxyphenyl-4''-methoxyphenyl)-methoxy]-ethylamine-(2),
1-[(3'-methoxyphenyl-phenyl)-methoxy]-ethylamine-(2),
1-[(4'-hydroxyphenyl-4''-tolyl)-methoxy]-ethylamine-(2),
1-[(2'-chlorophenyl-phenyl)-methoxy]-ethylamine-(2),
1-[(3'-chlorophenyl-3''-chlorophenyl)-methoxy]-ethylamine-(2),
1-[(4'-bromophenyl-4''-bromophenyl)-methoxy]-ethylamine-(2),
1-[(4'-methoxyphenyl-3''-methoxyphenyl)-methoxy]-ethylamine-(2),
1-[(4'-ethoxyphenyl-3''-ethoxyphenyl)-methoxy]-ethylamine-(2),
1-[(4'-propoxyphenyl-3''-propoxyphenyl)-methoxy]-ethylamine-(2),
1-[(3'-methoxyphenyl-4''-chlorophenyl)-methoxy]-ethylamine-(2),
1-[(2'-methoxyphenyl-4''-hydroxyphenyl)-methoxy]-ethylamine-(2),
1-[(4'-ethylphenyl-4''-ethylphenyl)-methoxy]-ethylamine-(2),
1-[(4'-methoxyphenyl-4''-ethylphenyl)-methoxy]-ethylamine-(2),
1-[(2'-ethoxyphenyl-4''-ethylphenyl)-methoxy]-ethylamine-(2),
1-[(4'-propoxyphenyl-4''-tolyl)-methoxy]-ethylamine-(2),
1-[(4'-hydroxyphenyl-4''-chlorophenyl)-methoxy]-ethylamine-(2), The substituents R and $R_1$ corresponding to Formula I may also be attached to the other carbon atoms of the phenyl nuclei. The amines used as starting materials may be prepared according to the method described in "Monatshefte für Chemie" 89, p. 342 (1948).

The reduction of the condensation products is carried out, for example, by catalytic hydrogenation. The metals of the eighth group of the Periodic Table (cf. D. E. Kirk and D. F. Othmer, Encyclopedia of Chemical Technology, vol. 5, p. 672), preferably noble metals such as palladium and platinum are suitable as catalysts. It is useful to operate in the presence of solvents which are known to be used for hydrogenation purposes, for example, aqueous alcohols, alcohols or water. Nickel catalysts, especially Raney-catalysts, may also be used. The reduction may otherwise be carried out by means of sodium boronhydride, whereby the condensation product is expediently prepared first from the amine and phenyl acetone, if necessary by moderate heating and in the presence of an inert organic solvent, for example, benzene or toluene. After dilution with a suitable solvent, for example, low molecular alcohols such as methanol or ethanol, the condensation product is reduced, if desired in the presence of water, by the portion-wise addition of sodium boronhydride. The reduction may also be carried out by means of nascent hydrogen, for example of aluminium amalgam and alcohol, sodium amalgam or lithium-aluminium hydride or otherwise electrolytically.

The methylation at the nitrogen atom of the NH group in the compounds thus obtained is carried out according to known methods, for example, by catalytic hydrogenation in the presence of formaldehyde or by heating the NH-compound with formaldehyde and concentrated formic acid.

According to the method described sub (b), the process of the invention is carried out by reacting an amine of the general Formula II with a 1-phenyl-2-halogen-propane compound or a 1-phenyl-2-halogen-propene compound, the phenyl moiety of which is substituted by one or two methoxy groups. 1-m-methoxyphenyl-2-chloropropane, 1-(m-m'-dimethoxy-phenyl)-2-chloropropane, 1 - (m - p-dimethoxy-phenyl) - 2 - chloropropane, the corresponding bromopropanes, chloropropenes and bromopropenes may be mentioned as examples. These starting substances may be obtained by halogenating methoxylated methylbenzyl carbinols (cf. Beilstein, vol. 5, page 391 and 5, I. Erg. Werk 190).

The reaction is preferably carried out in suitable solvents, for example aromatic hydrocarbons, as benzene or toluene, by prolonged heating. It is of advantage to react one mol of monomethoxylated or dimethoxylated 1-phenyl-2-halogen-propane or 1-phenyl-2-halogen-propene with two mols of the amine, the excess of the amine serving for binding the liberated hydrogen halide. The hydrogen halide may also be bound by the usual basic agents, such as alkali metal carbonates, alkaline earth metal carbonates, alkali metal hydroxides and alkaline earth metal hydroxides, or by organic bases such as pyridine or quinoline which may simultaneously serve as solvent. The reaction mixture obtained is worked up in the usual manner by separating the hydrohalic acid salt of the base, for example, by precipitation with ether or shaking with water. The products of the process may be purified by converting them into the appropriate salts. If propene halides are used, the double bond is subsequently hydrogenated according to known methods. The methylation of the NH group is carried out as described sub (a).

Furthermore, the products of the invention are prepared according to the method described sub (c), i.e. by reacting a halogenated ether of the general Formula III with a 1-phenyl-2-amino-propane compound which is substituted by one or two methoxy groups in the phenyl nucleus. As such halogenated ethers/the compounds corresponding to the amines of the Formula II which contain a halogen atom such as chlorine, bromine or iodine instead of the amino group, may be used, for example, β-bromethyl-benzhydryl ethers and β-chlorethyl-benzhydryl ethers which, for example, are provided by the process described in U.S. Pat. No. 2,567,350. According to the method described sub (d), the compounds of the invention are prepared by reacting benzhydrol derivatives which are substituted in the phenyl nuclei by the groups R and $R_1$ defined sub (a) with halogen-substituted bases of the general Formula IV. Especially 1 - (m - methoxy-phenyl)-2-(N-chlorethyl - N - methyl)-amino-propane, 1-(m-m-dimethoxy-phenyl) - 2 - (N - chlorethyl-N-methyl)-amino-propane and 1-(m-p-dimethoxy-phenyl)-2-(N-chlorethyl-N-methyl)-amino-propane and the corresponding 1-(methoxy or dimethoxy-phenyl)-2-(N-chlorethyl-N-benzyl)-amino-propane compounds may be used. These compounds may be prepared according to the methods described in U.S. Pats. Nos. 2,597,247 and 2,597,248.

According to the method described sub (d) the condensation of the benzhydrol derivatives with the halogen-substituted bases of the general Formula IV is preferably carried out in inert organic solvents, for example, benzene, toluene or xylene. As agents binding hydrogen halide, sodium amide, sodium phenyl, lithium phenyl and sodium metal may be mentioned for example. Two out of the three reaction components used (a benzhydrol, a halogen halide binding agent and a chlorine base) are expediently dissolved or suspended in benzene or similar solvents, and the third component is then added in several portions. The mixture is then boiled for some time under reflux and, after addition of water, is worked up in the usual manner, for example by extracting the basic components from the organic solvent by means of dilute acids.

In case of a benzyl group at the nitrogen atom or of a benzyloxy group in the phenyl moiety of the compound thus obtained, these substituents are split off in the usual manner, for example by catalytic hydrogenation in the presence of a noble metal catalyst.

The methylation at the nitrogen atom of the NH group in compounds of the general Formula VII is carried out as described sub (a).

Furthermore, according to the method described sub (e), the products of the invention are prepared by reacting diphenyl-bromomethane derivatives which are substituted by R and $R_1$ defined sub (a), with a basic alcohol of the general Formula V. As such basic alcohols, 1-(m-methoxy-phenyl)-2-(N-hydroxy-ethyl - N - methyl)-amino-propane and 1-(m-methoxy-phenyl - 2 - (N - hydroxy-ethyl-N-benzyl)-amino-propane may be mentioned as examples. These compounds can be prepared according to the processes described in U.S. Pats. Nos. 2,597,247 and 2,596,248. The reaction conditions correspond to those of benzhydrols with halogen bases of the Formula IV according to (d).

According to the method described sub (f), the products of the invention are prepared by reducing a carboxylic acid amide of the general Formula VI. These carboxylic acid amides may be prepared, for example, by reacting the corresponding acid chlorides with 1-(m-methoxy-phenyl)-2-amino-propane. The corresponding carboxylic acids or their halides may be prepared, for example, from sodium benzhydrol and bromacetic acid according to Journ. Org. Chem. 13, 830. The carboxylic acid amides are reduced according to known methods, preferably by means of lithium-aluminum hydride and in the presence of inert solvents, such as ether, dioxane or tetrahydrofuran. In this case, the carboxylic acid amide is added to the lithium-aluminum hydride suspension in one of the above-mentioned solvents, the reaction mixture is boiled for some time under reflux. The product obtained is then carefully decomposed with water and worked up in the usual manner by separating the organic from the inorganic components. The reduction of the carboxylic acid amides into the corresponding amines may also be carried out electrolytically.

The basically substituted products of the process of the present invention may be converted into their corresponding salts by means of physiologically tolerable inorganic or organic acids. As examples of inorganic acids, hydrohalic acids, such as hydrochloric acid and hydrobromic acid, sulfuric acid, phosphoric acid and amidosulfonic acid may be considered appropriate. As examples of organic acids, acetic acid, propionic acid, lactic acid, glycollic acid, gluconic acid, maleic acid, succinic acid, tartaric acid, benzoic acid, salicyclic acid, citric acid, aceturic acid, hydroxy-ethane-sulfonic acid and ethylene-diamine-tetracetic acid may be mentioned.

The products of the invention are useful as drugs. They have an especially beneficial efficiency on the heart and blood vascular circulation, which can be demonstrated in pharmacological tests.

The toxicity of the new products (minimum lethal dose upon intravenous administration to mice) amounts to 20 mg./kg. 50 micrograms of the known 1-(diphenyl-methoxy)-2-dimethyl-amino-ethane prepared according to U.S. Pat. No. 2,421,714 must be administered in order to exhibit a strong dilatation of the coronary vessels corresponding to an increase of the coronary blood flow of about 34%, but even in this case the period of action is short.

In contradistinction thereto, the administration, under the same test conditions, of only 0.5 microgram of 1-(m-methoxy-phenyl)-2-{N-[2' - (diphenyl-methoxy) - ethyl-(1')]-N-methyl-amino}-propane hydrochloride revealed an average increase of the coronary blood flow which amounts to 36%. Contraction and frequency of the heart were not influenced.

Furthermore, according to another method, the blood perfusion of the Ramus circumflexus of the left coronary-artery of a dog heart in situ was examined in four dogs in narcosis. Upon injection of 5 micrograms of 1-(m-methoxy-phenyl)-2-{N-[2' - (diphenyl-methoxy) - ethyl-(1')]-N-methyl-amino}-propane hydrochloride prepared according to the invention, the increase of the blood flow in this artery branch amounted to 64% on the average. Upon injection of 10 micrograms the increase of the blood flow amounted to 71% on the average, upon 20 micrograms to 122% and upon 100 micrograms to 150% on the average. Upon application of 1-(m - methoxy-phenyl)-2-{N-[2' - (diphenyl-methoxy) - ethyl-(1)]-N-methyl-amino}-propane hydrochloride in doses of 5 to 20 micrograms, the action lasts for 2 to 4 minutes, whereas the action of a dose of 100 micrograms lasts for 9 minutes.

The compounds of the invention may be administered as bases or in the form of their addition salts with physiologically tolerated acids, if desired in admixture with pharmaceutically suitable carriers, either parenterally or orally. For oral administration, the compounds may be used in the form of tablets or dragees which—in addition to one compound of the invention—also contain the pharmaceutically usual carriers, such as lactose, starch, tragacanth or magnesium stearate. As a single dose, 5–10 mg. of the compound may be administered. The following examples serve to illustrate the invention, but they are not intended to limit it thereto.

EXAMPLE 1

10 grams of benzhydrol and 13 grams of 1-m-methoxy-phenyl-2-(N-chloroethyl-N-methyl-amino)-propane (prepared by reacting m-methoxy-phenyl-acetone with amino-ethanol, reducing the Schiff base obtained with palladium and hydrogen, then methylating the oxyethyl compound with formaldehyde-formic acid and reacting the basic alcohol obtained with thionyl chloride) were dissolved in 200 cc. of benzene and heated under reflux for 6 hours with 2.7 grams of sodium amide. The benzene was evaporated under reduced pressure, the residue was taken up with ether and water, washed with water. Finally the ether solution was shaken with dilute hydrochloric acid. After standing over night, the oily hydrochloride, which separated as a third layer, crystallized. It was washed with acetic ester and dried.

16 grams of 1-(m-methoxy-phenyl)-2-{N-[2'-(diphenyl-methoxy)-ethyl-(1')]-N - methyl-amino}-propane hydrochloride were obtained which after solution in alcohol and precipitation with ether decomposed at 96–98° C.

EXAMPLE 2

15 grams of 1-(m,p-dimethoxy-phenyl)-2-(N-chlorethyl-N-methyl-amino)-propane (prepared from m,p-dimethoxy-phenyl-acetone with amino-ethanol by hydrogenating the Schiff base, methylating with formic acid and formaldehyde and reacting the thus obtained basic alcohol with thionyl chloride) and 12.8 grams of benzhydrol were dissolved in 50 cc. of benzene. After addition of 3.2 grams of sodium amide, the reaction mixture was heated under reflux for 6 hours. The benzene was evaporated under reduced pressure, the residue was dissolved in ether and water, while shaking. The separated ether solution was washed with water and shaken again with dilute hydrochloric acid. Three layers were formed. The lowest oily layer containing the crude salt of the base was separated. By shaking with sodium hydroxide solution and ether, an ethereal solution of the base was prepared, which was separated and dried by means of potassium carbonate. By adding oxalic acid, 1-(m,p-dimethoxy-phenyl)-2-{N-[2'- (diphenyl-methoxy) - ethyl-(1')]-N-methyl-amino}-propane oxalate was obtained. After being washed with alcohol, the product crystallized. Melting point 156–157° C. The yield was 19 grams.

EXAMPLE 3

According to the method described in Example 2, 6 grams of 1-(3,5 - dimethoxy-phenyl)-2-(N-chlorethyl-N-methyl-amino)-propane (prepared by reacting 3,5-di-dimethyl - phenyl - acetone with amino - ethanol, hydrogenating the Schiff base, methylating and treating the thus obtained basic alcohol with thionyl chloride) in 25 cc. of benzene, 4.8 grams of benzhydrol and 1.2 grams of sodium amide were heated at the boil for 5 hours. The reaction mixture was worked up as described in Example 2. 3.5 grams of 1-(3,5-dimethoxy-phenyl)-2-{N-[2'-(diphenyl-methoxy)-ethyl-(1')] - N-methyl-amino}-propane oxalate were obtained melting at 132–133° C.

EXAMPLE 4

5.4 grams of 1-diphenyl-methoxy-2-amino-ethane (prepared according to "Monatshefte für Chemie" 89, 342) and 4.2 grams of M.P.-dimethoxy-phenyl-acetone (prepared according to J. Org. Chem. 16, 221 to 224 [1951]) were mixed. After adding 10 cc. of benzene, the greater part of the benzene was evaporated with the water which had formed. The residue was then dissolved in 20 cc. of methanol and mixed with 0.5 gram of sodium boronhydrid in small portions. After cooling, the solution was acidified with 2 N-hydrochloric acid, and the solvent was removed. The residue was rendered alkaline by means of 2 N-sodium hydroxide solution, and the separated base was extracted with ether. After evaporating the ether, the product was taken up in 10 grams of absolute formic acid, 8 grams of a formaldehyde solution of 40% strength were added, and the mixture was heated for 30 minutes on the steam bath, whereby a vigorous evolution of carbon dioxide occurred. The substance formed was rendered alkaline by means of 2 N-sodium hydroxide solution and extracted with ether; 1-(m,p-dimethoxy-phenyl)-2-{N-[2' - (diphenyl-methoxy) - ethyl-(1')]-N-methyl-amino}-propane oxalate melting at 156–157° C. was precipitated from the ether solution according to the method described in Example 2.

EXAMPLE 5

12.4 grams of β-bromoethyl-benzhydryl ether and 16.6 grams of 1-(m,p-dimethoxy-phenyl)-2-amino-propane (prepared according to Chem. Berichte 43, page 193 [1910]) in 100 cc. of toluene were heated under reflux for 10 hours. After addition of ether, 1-(m,p-dimethoxy-phenyl)-2-amino-propane hydrobromide was retained by filtration. The solvent was reduced from the filtrate under reduced pressure, and the residue was converted into 1-(m,p - dimethoxy-phenyl)-2-{N-[2'-(diphenylmethoxy)-ethyl-(1')]-N-methyl-amino}-propane oxalate, melting point 156–157° C. by methylation as described in Example 4.

EXAMPLE 6

11.4 grams of 1-diphenyl-methoxy-2-amino-ethane (prepared according to "Monatshefte für Chemie" 89, 342) and 8.2 grams of m-methoxy-phenyl-acetone were mixed. After adding 10 cc. of benzene, the greater part of the benzene was evaporated together with the water which had formed; the residue was dissolved in isopropanol and shaken with palladium black and hydrogen at 40–50° C. until the equivalent amount of hydrogen was absorbed. After removing the catalyst and the solvent, the residue was converted into 1-(m-methoxy-phenyl)-2-{N-[2'-diphenyl - methoxy)-ethyl-(1')]-N-methylamino}-propane by methylation as described in Example 4, the hydrochloride of the compound melted at 96–98° C.

EXAMPLE 7

By reacting 8 grams of p-methoxy-benzhydrol, 9 grams of 1-(m-methoxy-phenyl)-2-(N-chloroethyl - N - methylamino)-propane and 1.8 grams of sodium amide in 100 cc. of benzene according to the method described in Example 1, 1-(m-methoxy-phenyl)-2-{N-[2'-(p-methoxyphenyl-phenyl-methoxy)-ethyl-(1')] - N - methyl-amino}-propane oxalate was obtained melting at 123–125° C.

EXAMPLE 8

By reacting 8.2 grams of p-chlorobenzhydrol, 9 grams of 1-(m-methoxy - phenyl)-2-(N-chloroethyl-N-methylamino)-propane and 1.8 grams of sodium amide in 100 cc. of benzene according to the method described in Example 1, 1-(m-methoxy - phenyl)-2-{N-[2'-(p-chlorophenyl-phenyl-methoxy)-ethyl-(1')]-N-methyl - amino}-propane hydrochloride was obtained, melting at 95–96° C.

EXAMPLE 9

By reacting 8.9 grams of p-chlorobenzhydrol, 11 grams of 1-(3,4-dimethoxy - phenyl)-2-[N-methyl-N-(chloroethyl)-amino]-propane and 2 grams of sodium amide in 100 cc. of benzene according to the method described in Example 12, 1-(m,p-dimethoxy - phenyl)-2-{N-[2'-(p-chlorophenyl-phenyl-methoxy)-ethyl-(1')-] - N - methyl-amino}-propane oxalate was obtained, melting point 136–138° C.

We claim:

1. Basically substituted diphenyl-methyl-ethers of the general Formula I

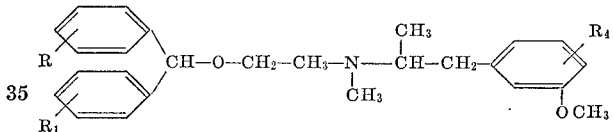

in which R and $R_1$ each represent hydrogen, chlorine, bromine, hydroxyl or an alkyl or alkoxy group containing at most 3 carbon atoms and $R_4$ represents hydrogen or the methoxy group and addition salts of said compounds with physiologically tolerable acids.

2. 1-(m-methoxy-phenyl) - 2 - {N-[2'-(diphenyl-methoxy)-ethyl-(1')]-N-methyl-amino}-propane.

3. 1-(m,p-dimethoxy-phenyl) - 2 - {N-[2'-(diphenyl-methoxy)-ethyl-(1')]-N-methyl-amino}-propane.

4. 1-(m-methoxy-phenyl) - 2 - {N-[2'-(p-methoxy-phenyl-phenyl-methoxy)-ethyl-(1')] - N - methyl-amino}-propane.

5. 1 - (3,5 - dimethoxyphenyl) - 2 - {N-[2'-diphenyl-methoxy)-ethyl-(1')-]-N-methyl-amino}-propane.

6. 1-(m-methoxy-phenyl) - 2 - {N-[2'-(p-chlor-phenyl-phenyl-methoxy)-ethyl-(1')] - N - methyl-amino}-propane.

References Cited

UNITED STATES PATENTS

| | | | |
|---|---|---|---|
| 3,128,308 | 4/1964 | Doub et al. | 260—570X |
| 3,152,173 | 10/1964 | Ehrhart et al. | 260—570X |
| 3,177,253 | 4/1965 | Ehrhart et al. | 260—570 |

FOREIGN PATENTS

| | | | |
|---|---|---|---|
| 26/4926 | 1951 | Japan | 260—570 |

ROBERT V. HINES, Primary Examiner

U.S. Cl. X.R.

260—501.18, 501.19, 559, 566, 570.8, 611; 424—330

PO-1050
(5/69)

UNITED STATES PATENT OFFICE
CERTIFICATE OF CORRECTION

Patent No. 3,565,955      Dated February 23, 1971

Inventor(s) Gustav Ehrhart, Ernst Lindner and Heinrich Ott

It is certified that error appears in the above-identified patent and that said Letters Patent are hereby corrected as shown below:

In the Heading, after "Ser. No. 677,469" and before the International Classification number, insert:

--Claim priority, German Applications F 35,984, February 9, 1962 and F 37,514, August 3, 1962.--

Signed and sealed this 13th day of July 1971.

(SEAL)
Attest:

EDWARD M. FLETCHER, JR.
Attesting Officer

WILLIAM E. SCHUYLER, JR.
Commissioner of Patents